(12) United States Patent
Pichler et al.

(10) Patent No.: US 11,481,595 B2
(45) Date of Patent: Oct. 25, 2022

(54) DUAL SYSTEM RFID TAG

(71) Applicant: NXP B.V., Eindhoven (NL)

(72) Inventors: Thomas Pichler, Graz (AT); Ivan Jesus Rebollo Pimentel, Graz (AT); Christian Weidinger, Graz (AT); Franz Amtmann, Graz (AT); Werner Zettler, St. Marein im Muerztal (AT); Heinz Umfahrer, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/247,650

(22) Filed: Dec. 18, 2020

(65) Prior Publication Data

US 2022/0198237 A1 Jun. 23, 2022

(51) Int. Cl.
*G06K 19/077* (2006.01)
*G06K 7/10* (2006.01)

(52) U.S. Cl.
CPC ... *G06K 19/07773* (2013.01); *G06K 7/10366* (2013.01)

(58) Field of Classification Search
CPC ......... G06K 19/07773; G06K 7/10366; G06K 19/0713; H03K 3/012; H02M 3/07
USPC ....................................................... 340/10.1
See application file for complete search history.

(56) References Cited

U.S. PATENT DOCUMENTS

| | | | |
|---|---|---|---|
| 7,339,481 B2 | 3/2008 | Duron | |
| 7,579,906 B2 | 8/2009 | Kumar et al. | |
| 7,907,899 B1 | 3/2011 | Oliver | |
| 7,944,279 B1 * | 5/2011 | El Waffaoui | G06K 19/0713 340/572.1 |
| 8,186,601 B2 * | 5/2012 | Russell | G06K 19/0713 235/492 |
| 8,258,958 B2 | 9/2012 | Kang et al. | |
| 8,729,960 B2 | 5/2014 | Ochoa et al. | |
| 8,952,792 B1 | 2/2015 | Srinivas et al. | |
| 9,048,819 B2 | 6/2015 | Rokhsaz et al. | |
| 9,087,281 B2 | 7/2015 | Maguire et al. | |
| 9,360,504 B2 | 6/2016 | Pillin et al. | |
| 9,362,895 B2 | 6/2016 | Seth et al. | |
| 9,514,402 B1 | 12/2016 | Kim et al. | |
| 10,679,115 B2 | 6/2020 | Huhtasalo | |

(Continued)

FOREIGN PATENT DOCUMENTS

| | | |
|---|---|---|
| CN | 104517133 A | 4/2015 |
| CN | 110766122 A | 2/2020 |

(Continued)

OTHER PUBLICATIONS

Missoni, et al. "A Triple-Band Passive RFID Tag", IEEE International Solid-State Circuits Conference—Digest of Technical Papers, 3 pgs., retreived from the internet at: https://ieeexplore.ieee.org/document/4523170, (Feb. 2008).

(Continued)

*Primary Examiner* — Vernal U Brown

(57) ABSTRACT

A Radio Frequency Identification (RFID) tag is disclosed. The RFID tag includes an antenna to receive an input AC signal and a tuning system coupled with the antenna to optimize signal strength of the input AC signal. The tuning system includes a charge pump rectifier. A diode rectifier is included and is coupled with the antenna to receive the input AC signal after the tuning system optimizes the signal strength by tuning input impedance of the antenna.

15 Claims, 2 Drawing Sheets

(56) References Cited

U.S. PATENT DOCUMENTS

| | | |
|---|---|---|
| 2003/0085278 A1 | 5/2003 | Schoenbauer |
| 2005/0104553 A1 | 5/2005 | Mickle et al. |
| 2007/0153940 A1 | 7/2007 | Oishi |
| 2010/0019907 A1 | 1/2010 | Shanks |
| 2011/0148221 A1 | 6/2011 | Trotter et al. |
| 2011/0241750 A1 | 10/2011 | Hill |
| 2012/0049937 A1 | 3/2012 | El Waffaoui |
| 2013/0321130 A1 | 12/2013 | Waffaoui et al. |
| 2014/0203989 A1 | 7/2014 | Jeong et al. |
| 2016/0328584 A1* | 11/2016 | Rokhsaz ............ G06K 19/0717 |
| 2017/0093167 A1* | 3/2017 | Von Novak, III ...... H02J 7/025 |
| 2017/0281944 A1 | 10/2017 | Khalil et al. |
| 2020/0195256 A1 | 6/2020 | Emira et al. |
| 2021/0248331 A1 | 8/2021 | Storms et al. |

FOREIGN PATENT DOCUMENTS

| | | |
|---|---|---|
| EP | 2669851 A2 | 12/2013 |
| KR | 101939239 B1 | 4/2019 |

OTHER PUBLICATIONS

U.S. Appl. No. 17/247,647, filed Dec. 18, 2020, entitled: RFID TAG. The Examiner is referred to the copending patent prosecution of the common Applicant (no attachment).

* cited by examiner

DUAL SYSTEM RFID TAG

CROSS-REFERENCE TO RELATED APPLICATIONS

This application is related to the application Ser. No. 17/247,647, entitled "RFID Tag" filed concurrently with the present application. Said application is incorporated herein in its entirety.

BACKGROUND

Radio Frequency Identification (RFID) refers to a wireless system comprised of two components: tags and readers. The reader is a device that has one or more antennas that emit radio waves and receive signals back from the RFID tag. Tags, which use radio waves to communicate their identity and other information to nearby readers, can be passive or active. Passive RFID tags are powered by the reader and do not have a battery. Active RFID tags are powered by batteries. Near Field Communication (NFC) is a wireless communication technology that acts over short distances for two-way communication. The use of NFC tags is growing in several markets, including the medical, consumer, retail, industrial, automotive, and smart grid markets. NFC is a type of RFID technology. Due to internal or external factors such as distance from the other device or tag, nearby objects, production tolerance of the IC and or label, etc. the tag needs to be tuned to balance the impedance to optimize the received signal strength before a data read cycle starts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, Radio Frequency Identification (RFID) tag is disclosed. The RFID tag includes an antenna to receive an input AC signal and a tuning system coupled with the antenna to optimize signal strength of the input AC signal. The tuning system includes a charge pump rectifier. A diode rectifier is included and is coupled with the antenna to receive the input AC signal after the tuning system optimizes the signal strength by tuning input impedance of the antenna.

In another embodiment, a method of operating a Radio Frequency Identification (RFID) tag is disclosed. The method includes receiving an input AC signal through an antenna, optimizing signal strength of the input AC signal using a charge pump rectifier and converting the input AC signal using a diode rectifier after optimizing the signal strength by tuning input impedance of the antenna based on the output of the charge pump rectifier. The method includes receiving an input AC signal through an antenna, optimizing the signal strength of the input AC signal using a charge pump rectifier, using the optimized AC signal using a diode rectifier and performing the energy optimizing by tuning the input impedance of the antenna based on the output of the charge pump rectifier.

In yet another example, an integrated circuit (IC) is disclosed. The IC includes a port to receive an input AC signal and a tuning system coupled with the port to optimize signal strength of the input AC signal. The tuning system includes a charge pump rectifier. The IC also includes a diode rectifier coupled with the port to receive the input AC signal after the tuning system optimizes the signal strength by tuning input impedance of the antenna coupled with the port.

In some examples, the tuning system uses the charge pump rectifier for tuning the input impedance. The tuning system is configured to tune the input impedance in a preselected number of steps. The tuning system includes a variable impedance component coupled with the antenna to alter the input impedance based on the output of the charge pump rectifier. The diode amplifier is configured to provide an input power to a main system. The main system is configured to create a return link for sending data back to an external reader. In some examples, the RFID tag may include a link between the tuning system and a main data processing system of the RFID tag to provide an indication that a tuning cycle has been performed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Figure 1:
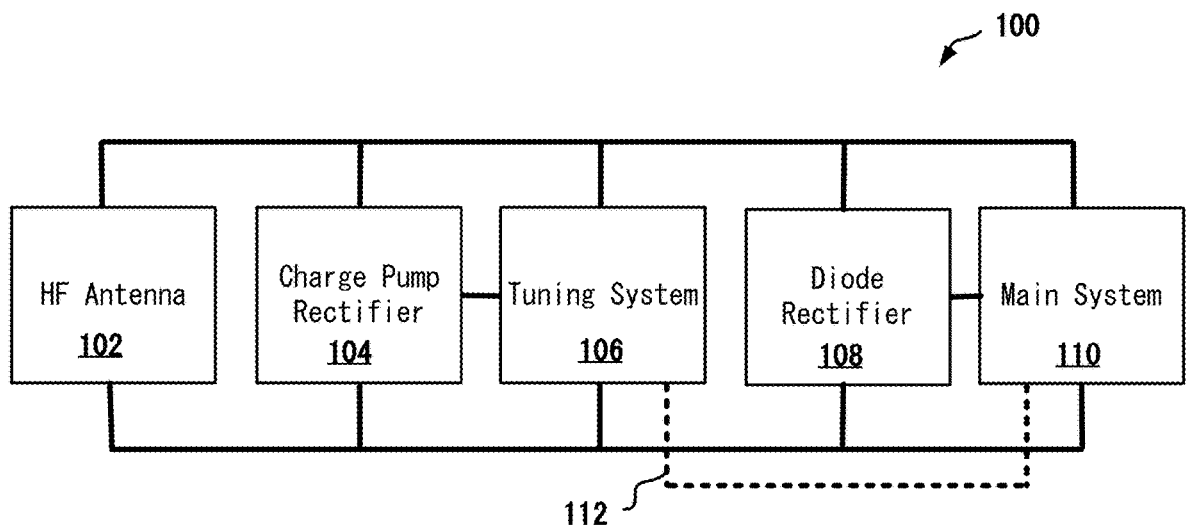
FIG. 1 depicts a RFID tag in accordance with one or more embodiments of the present disclosure.

Note that figures are not drawn to scale. Not all components of the dual system RFID tag are shown. The omitted components are known to a person skilled in the art.

DETAILED DESCRIPTION

Many well-known manufacturing steps, components, and connectors have been omitted or not described in details in the description so as not to obfuscate the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "one example", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Typical RFID Tags feature a rectifier for generating the energy needed by the tag. The rectifier generally has a fixed topology and defines the operating conditions of the tag. In other typical implementations multiple frontends are used for different operating modes such as HF or UHF. The frontends may be connected to the same or different antennas and may target different operating frequencies (e.g., 13.56 MHz, 800 MHz, 1 GHz) and protocols.

Embodiments described herein show a HF RFID Tag that has two different systems with independent clock, bias voltage, etc., using the same antenna and operating frequency. The first system uses a charge pump rectifier for performing an optimization function for the second system that uses a diode rectifier for performing the data processing functions. The use of the diode rectifier is advantageous to provide required power for the second system that may need to send data back to a reader through a back link. It should be noted that the RFID tag may be a passive tag that uses the energy of the received signal to send the data back. The charge pump rectifier is known to work at low received signal amplitude. However, the received signal amplitude may not be sufficient to provide a strong return signal so that a RFID reader can receive the data from the RFID tag.

In typical RFID tags, a self-tuning circuitry is used for widening the bandwidth and compensating negative tuning effects. In such implementations a sub circuit is used before the main system and uses the same rectifier for both the sub circuit and the main system. This approach is not working for HF transponders because of conflicting requirements. Energy wise the dominating parameter for higher bandwidth of the RFID transponder is a low minimum input voltage. However, a high voltage swing during load modulation is key for a strong return link signal. For a good system performance a transponder needs both enough energy to operate and a strong return link to make itself heard by the reader. A charge pump as rectifier enables a very low minimum operating voltage and therefore a high bandwidth, however, leads to a very poor return link. A diode based rectifier does not allow an improvement (vs. state of the art) in minimum voltage, but enables a good return link strength. This invention combines a charge pump rectifier system and a diode based rectifier system working on the same antenna and frequency to build a combined system that provides a low minimum voltage for a high bandwidth combined with a strong return link. The charge pump rectifier system starts up at very low voltage and adjusts the operating point of the diode rectifier system with respect to input impedance. This way the minimum voltage for the diode based rectifier system is reached and a large voltage swing can provide a strong return link.

RFID tags can store a range of information from one serial number to several kbytes of data. RFID tags are used to identify persons and objects. RFID systems can also be built into the architecture of a cabinet, room, or building. NFC is a technology based on RFID technology. NFC technology can be used to provide peer-to-peer communication or one way communication. When two NFC enabled devices are very close to each other, about 4 cm or less, they can communicate with each other using the radio waves. Of the two devices communicating using NFC, at least of them has to be an active device (powered). In many cases, this would be a smartphone, tablet, security pad, or a payment terminal. The other device can be either active or passive (unpowered). Using NFC, two devices can be set up in less than one-tenth of a second.

In an active peer-to-peer (P2P) mode, two active devices create a wireless communication channel between them. The active device, with an external power supply, can power the passive device with the electromagnetic field coming from the active device. NFC passive devices are used in many applications because the passive NFC device can be a simple tag. NFC devices communicate with each other via radio waves. The active NFC device has to be enabled (turned on) first. The radio waves for NFC are generated using an antenna. NFC works by exploiting the properties of electromagnetic fields, using the inductive coupling between NFC devices.

The strength of the received signal may be dependent on the distance as well as external factors such as nearby objects, human touch, etc. Therefore, in some examples, RFID tags may include a switchable capacitor bank that includes a plurality of capacitors coupled with switches. The value of the capacitor may be changed by turning one or more of these switches on or off. The input impedance of the receiver antenna may be changed by changing the capacitor value to optimize the signal strength of the input signal.

The first system uses a charge pump rectifier for performing an optimization function for the second system that uses a diode rectifier for performing the data processing functions. The use of the diode rectifier is advantageous to provide required power for the second system that may need to send data back to a reader through a back link. It should be noted that the RFID tag may be a passive tag that uses the energy of the received signal to send the data back. The charge pump rectifier is known to work at low received signal strength. However, the received signal strength may not be sufficient to provide sufficient power for a stronger backlink.

FIG. 1 shows a schematic of an RFID tag 100 that includes an antenna 102. The antenna 102 may be a wire coil type antenna. The antenna 102 provides the input AC signal to a charge pump (e.g., AC to DC converter) 104. The input signal is a continuous wave with a predefined frequency (e.g., 13.56 MHz or from kHz up to GHz range). The charge pump 104 converts the input AC signal to a DC voltage. In some embodiments, the charge pump 104 may also amplify the signal using a bias voltage. The charge pump 104 may use diodes and charging/discharging capacitors to change the input AC signal to higher voltage DC signal. In some examples, transistors may be used in place of diodes. The operating frequency range is limited by the capacitor size and diode switching speed, therefore, the circuit may be tuned for an operational frequency of 13.56 MHz (for example) by using the capacitors and diodes of appropriate value and electrical characteristics.

The charge pump 104 may include or may be coupled with a limiter circuit to limit the max voltage to a predefined level. The limiter circuit protects the components of the RFID tag 100 from electrostatic events or too high received signal strength. A tuning system 106 is included and configured to optimize the input signal strength by tuning the input impedance of the antenna 102 based on the output of the charge pump 104. For example, the tuning system 106 may keep altering the input impedance of the antenna 102 until the output of the charge pump 104 continues to increase.

A diode rectifier 108 is included to power the main system 110. The main system 110 is configured to decode the data received through the input AC signal through the antenna 102 that is magnetically coupled with an RFID reader (not shown) and to generate a back link to provide the data back to the RFID reader. It should be noted that the RFID tag 100 may be a passive tag that does not include an internal power source. Therefore, the return link to send the data back is formed using the energy of the input AC signal.

Figure 3:
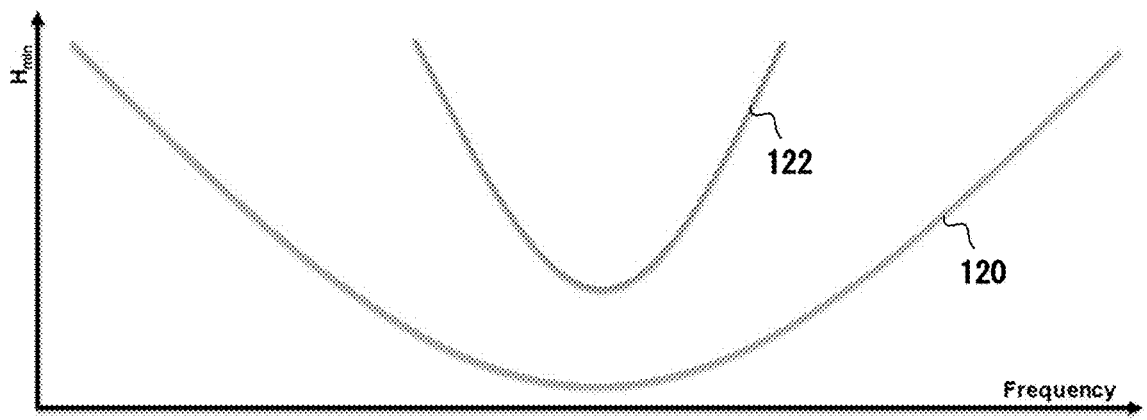
FIGS. 3, 4 and 5 show minimum field strength ($H_{min}$) over frequency curves.

Moving to FIG. 3 that shows a frequency (f)—minimum field strength ($H_{min}$) curve 120 for the charge pump 104 and a frequency-field strength curve 122 for the diode rectifier 108. As apparent the charge pump 104 provides a better bandwidth but lower output power. The power in a desired frequency range may not be sufficient to provide a suitably strong return link to enable the RFID reader to receive data from the RFID tag 100. While the diode rectifier 108 provides more power compared to the charge pump 104, the bandwidth is limited. The RFID tag 100 is configured to increase the overall bandwidth by using the charge pump 104 to optimize the diode rectifier 108.

Figure 4:
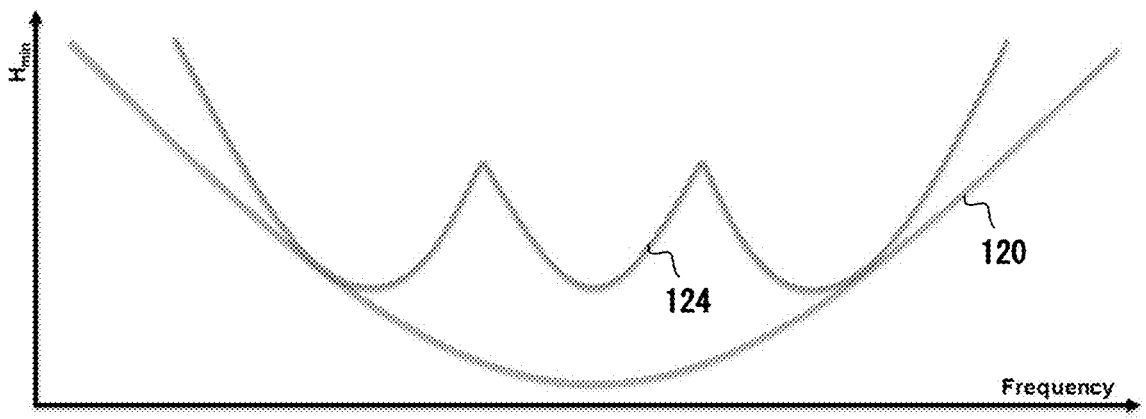
Figure 5:
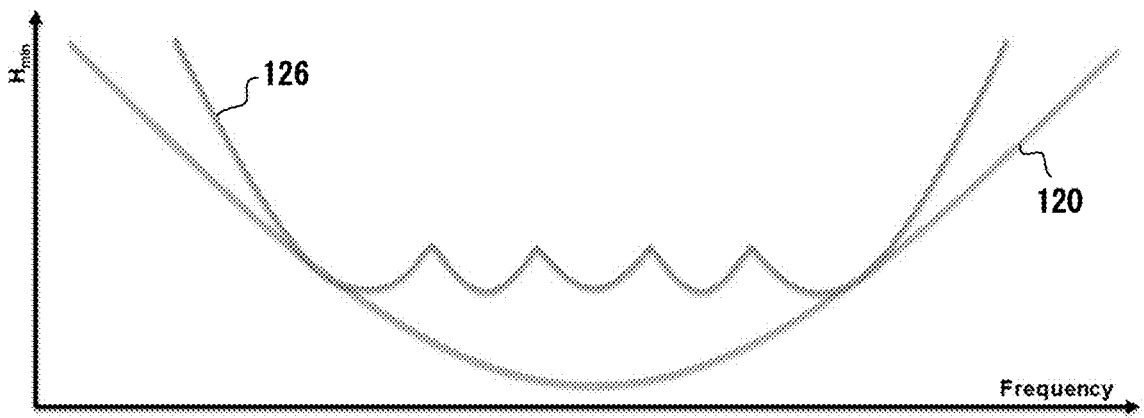

Typically, during the RFID communication, the first phase of the communication may include a tuning cycle. In the tuning phase, the tuning system 106 is configured to optimize the output of the diode rectifier 108 in steps or continuously. For example, when a power source (e.g., a RFID reader) is within the range, the RFID tag will continuously tune the input impedance to optimize the input signal strength. The number of steps may be configurable. For example, FIG. 4 shows the diode rectifier 108 frequency-field strength curve 124 using three tuning steps and FIG. 5 shows the diode rectifier 108 frequency-field strength curve 126 using five tuning steps. Once the tuning cycle is completed to achieve a desired output of the diode rectifier 108, an optional link 112 may be used to provide a notification to the main system 110 so that the main system 110 may create a modulated return link to transmit the data stored in the RFID tag 100 to the RFID reader. It should be noted that the charge pump 104 may not provide a current directly to the diode rectifier 108. The charge pump 104 and the tuning system 106 are configured to optimize the input impedance of the antenna 102 such that the diode rectifier 108 receives a maximum amount of power from the input AC signal received through the antenna. 102.

If the diode rectifier 108 alone is used without the charge pump 104, as shown by the curve 122 (FIG. 3), the operating frequency range in which the RFID tag 100 could operate will be limited. However, if the charge pump 104 is used to optimize the antenna impedance first, the diode rectifier 108 can operate in a comparatively wider frequency range.

Figure 2:
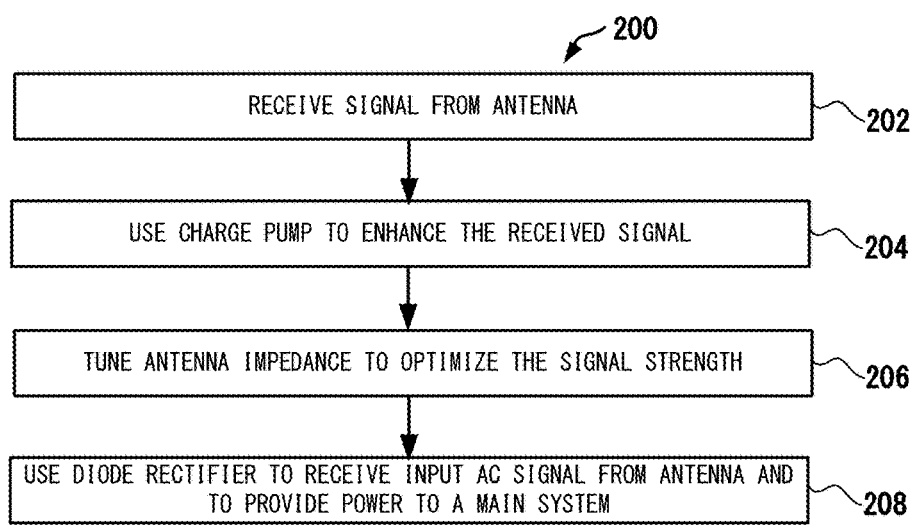
FIG. 2 depicts a method of tuning the RFID tag in accordance with one or more embodiments of the present disclosure.

FIG. 2 shows a method 200 for optimizing the input signal strength in an RFID tag. Accordingly, at step 202, an AC input signal is received through an antenna. The AC input signal may be originating from an RFID reader that is attempting to read data stored in the RFID tag. The RFID tag may be a passive tag. At steps 204, 206, a charge pump rectifier is used to tune the input impedance of the antenna to enhance the strength of the input AC signal. This tuning can be done in a predefined number of steps or continuously. The tuning may be performed, for example, by changing the capacitance of a capacitor bank that is coupled with the antenna. In some embodiments, a combination of variable capacitor and resistor may be used for changing the input impedance of the antenna. Typically, the tuning system will increase or decrease the impedance in one direction and monitor the output of the charge pump. When the output starts to fall, the direction of the change in the impedance may be reverted until an optimized output is received. At step 208, a diode rectifier is used to receive the AC input signal from the antenna. The diode rectifier than provides the power to a main system that may create a return link to enable the RFID reader to receive data from the main system. In some embodiments, at least some (or all) of the charge pump rectifier 104, the tuning system 106, the diode rectifier 108 and the main system 110 may be incorporated in an integrated circuit (IC). The IC can then be incorporated in an RFID tag.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A Radio Frequency Identification (RFID) tag, comprising:
   an antenna to receive an input AC signal;
   a tuning system coupled with the antenna to optimize a signal strength of the input AC signal based on an output from a charge pump rectifier that is used for tuning an input impedance of the antenna; and
   a diode rectifier coupled with the antenna to receive the input AC signal after the tuning system optimizes the signal strength, where the charge pump rectifier is connected with the tuning system to optimize the signal strength of the input AC signal without the charge pump rectifier providing current directly to the diode rectifier.

2. The RFID tag of claim 1, wherein the tuning system is configured to tune the input impedance in a preselected number of steps.

3. The RFID tag of claim 1, wherein the tuning system is configured to tune the input impedance continuously when the input AC signal is present.

4. The RFID tag of claim 1, wherein the tuning system includes a variable impedance component coupled with the antenna to alter the input impedance based on an output of the charge pump rectifier.

5. The RFID tag of claim 1, wherein the diode rectifier is configured to provide an input power to a main system, wherein the main system is configured to create a return link for sending data back to an external reader.

6. The RFID tag of claim 1, further including a link between the tuning system and a main data processing system of the RFID tag to provide an indication that a tuning cycle has been performed.

7. A method of operating a Radio Frequency Identification (RFID) tag, the method comprising:
   receiving an input AC signal through an antenna;
   optimizing a signal strength of the input AC signal using a charge pump rectifier for tuning an input impedance of the antenna; and
   converting the input AC signal using a diode rectifier to power the main system, where the charge pump rectifier is connected to optimize the signal strength of the input AC signal without providing current directly to the diode rectifier.

8. The method of claim 7, wherein the optimizing is performed in a preconfigured number of steps.

9. The method of claim 7, wherein the optimizing is performed continuously.

10. The method of claim 7, wherein the optimizing is performed by altering an impedance of a component that is coupled with the antenna based on an output of the charge pump rectifier.

11. The method of claim 7, further including providing power to a main system after the converting.

12. An integrated circuit (IC), comprising:
    a port to receive an input AC signal;
    a tuning system coupled with the port to optimize signal strength of the input AC signal based on an output from a charge pump rectifier; and
    a diode rectifier coupled with the port to receive the input AC signal after the tuning system optimizes the signal strength of the input AC signal, where the charge pump rectifier is connected with the tuning system to optimize the signal strength of the input AC signal without the charge pump rectifier providing current directly to the diode rectifier.

13. The IC of claim 12, wherein the tuning system is configured to tune the input impedance in a preselected number of steps.

14. The IC of claim 12, wherein the tuning system is configured to tune the input impedance continuously when the input AC signal is present.

15. The IC of claim 12, wherein the tuning system includes a variable impedance component coupled with the port to alter the input impedance based on an output of the charge pump rectifier.

* * * * *